Aug. 8, 1961 S. N. MOFFET 2,994,964
TRANSPARENT GAUGE
Filed Sept. 17, 1958

United States Patent Office 2,994,964
Patented Aug. 8, 1961

2,994,964
TRANSPARENT GAUGE
Samuel N. Moffet, 30 City Terrace, Newburgh, N.Y.
Filed Sept. 17, 1958, Ser. No. 761,604
4 Claims. (Cl. 33—184.5)

This invention relates to the printing art in general, and more particularly to a device for aiding an operator of a printing press to accurately align a printing plate onto the cylinder of an offset press.

A problem arises in the printing of multiple copies from a single master plate to properly align the single master plate to the plate cylinder of a printing press so that once proper alignment has been made, such master plate can be rigidly fastened to the cylinder plate with the assurance that all copies will be printed in proper registry. Where the printing press operator relies solely upon his eyesight, he normally will run off a few copies, stop the press, check whether or not alignment is correct, and resume printing. If the alignment is not correct, the operator will have to reset the master plate onto the plate cylinder. All such stops and starts are wasteful of time and material.

In order to avoid the lost time and materials inherent in the aforementioned procedure, it has been proposed to use a transparent plastic gauge as a means for aligning the master plate in registry with the printing plate prior to fixing the former to the latter. Such gauges, however, have had to be laid aside after the registry was carried out because their presence would interfere with the normal printing operation, or would interfere with the monitoring of the printing operation.

The present invention provides a novel transparent gauge for accurately aligning paper or metal master plates onto the cylinder of an offset press wherein such gauge is adjustably secured to a bar that is attached to the frame that supports the printing cylinder. The bar permits the gauge to be moved laterally across the plate to be registered, if and when different sized master plates are to be aligned. Moreover the transparent gauge is hinged along its midsection so that the gauge, after registry is attained, can be moved out of position so as not to hinder the observation of the printing operation.

It is an object to provide a novel gauge for aiding in the accurate alignment of a master plate onto an offset press.

It is a further object to provide a novel transparent gauge that can remain affixed to the frame of the printing press without interfering with the operation or observation of the printing operation.

Figure 1:
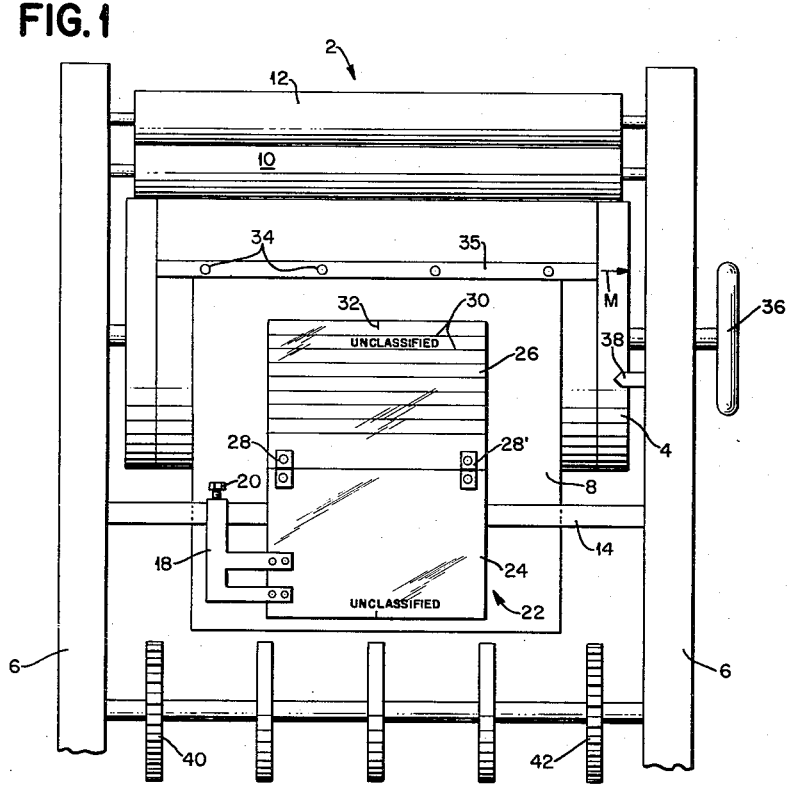
Figure 2:
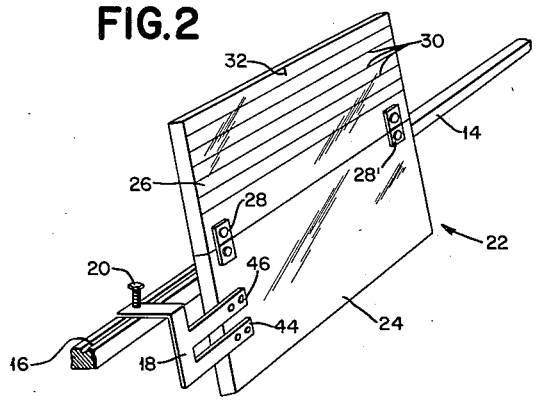

The various features of novelty whereby my invention is characterized will hereinafter be pointed out with particularity in the claims. For a full understanding of my invention and of its objects and advantages, reference may be had to the following detailed description taken in connection with the accompanying drawing, wherein:

FIG. 1 is a front view of the invention as it is affixed to a printing press; and FIG. 2 is a perspective view of the invention, per se.

FIG. 1 shows the rear of a printing press 2, it being understood that only enough of the press 2 is being shown to illustrate the invention. The plate cylinder 4 is secured to a frame 6, such cylinder 4 being the roller on which a master plate 8 is to be secured. Rollers 10 and 12 are conventional water rollers that coact with cylinder 4 during printing, so that copies of the master print 8 can be made. Fixed to frame 6 is a cross-bar 14 in which a channel 16 (seen in FIG. 2) is cut. An offset arm 18 rides along such cross-bar 14 and such arm 18 may have a keyway that locks with channel 16 as such arm 18 moves along bar 14. Threaded screw 20 fixes arm 18 to bar 14.

Fixed to arm 18 is a transparent plate 22 having a lower section 24 and an upper section 26, both sections being hinged at 28 and 28'. Etched or otherwise placed on the upper half 26 of the transparent plate 22 are markings 30 and 32. It is to be understood that such markings could include vertical lines as well as horizontal lines 30. On the periphery of cylinder 4 are located a plurality of locking screws, pins or bolts 34, such screws serving to secure the top edge of master plate 8 to cylinder 4, the master plate 8 being inserted under gripping bar 35. Another set of locking pins are not shown, but they lie along a lower surface of cylinder 4 and lock the bottom edge of master plate 8 to cylinder 4 so that such master plate 8 is bent to conform to the curvature of cylinder 4. Wheel 36 permits cylinder 4 to be manually turned and arrow indicator 38 and gears 40, 42, etc. are conventional features of a rotary press that are well-known to those who operate offset printing presses.

The operation of the invention will now be described. The printer will bring plate cylinder 4 to a predetermined position as indicated by metal arrow 38 on frame 6 and recessed mark M on cylinder 4 edge, then take his plate 8, which is usually a thin sheet of pliable metal or paper having the information thereon to be duplicated, temporarily position the top edge of such plate 8 on cylinder 4 by means of locking pins 34 that are recessed in gripper bar 35 on cylinder 4. The printing plate 8 will hang down and be held in back of transparent sheet 22. The transparent sheet is maintained by arm 18 at an angle to bar 14 so that the bottom section 24 comes up out of the plane of the drawing and top section 26 goes into the plane of the drawing. Such angular positioning of the transparent sheet 22 aids in aligning the master plate 8 with transparent sheet 22. The operator looks at the indicia or markings 30, 32, etc. and aligns such markings with significant portions of plate 8. For example, correct alignment may require that marking 32 lie between the letters "C" and "L" of the word "UNCLASSIFIED." Any other lines that have been etched into transparent sheet 22 may be used if desired.

After noting such alignment, he tightens locking bolts 34 so that plate 8 is rigidly secured to cylinder 4. The upper half 26 of transparent sheet 22 is swung down and out of the way, and handle 36 is rotated so that the bottom of plate 8 can be attached to a spring actuated gripping bar (not shown) on cylinder 4. The printing process can begin and the operator can watch such process without having to entirely remove the gauge from the printing press.

The transparent plate 22 may be made of plastic, unbreakable glass, or the like. Moreover the plate 22 may be broken at a line such that portion 26 has an area that is twice that of section 24 or any multiple thereof. If desired, section 24 may be removably affixed to offset arm 18 at the areas 44 and 46 using set screws and the like so that other size transparent gauges may be substituted for the one shown.

While I have illustrated and described in detail only preferred forms of my various attachments, I do not desire to be limited to the specific constructions thus illustrated and described, but intend to cover all embodiments which come within the terms of the definitions of my invention constituting the appended claims.

What is claimed is:

1. A device for aiding in the correct registry of a printing plate having indicia thereon onto the cylinder of an offset press comprising a rectangular sheet of transparent material, said rectangular sheet being broken along a line parallel to its upper and lower edges so as to form two sections of transparent material, hinge means connecting said two sections so as to permit said two sections to lie in the same plane or in separate planes, and markings on said sections whereby one may hold a printing plate flush with the back of said transparent sheet and observe if such markings jibe with the indicia on said printing plate.

2. A device for aiding in the correct registry of a printing plate as defined in claim 1 including a cross-bar located on said offset press adjacent said cylinder, and means for supporting said transparent sheet on said cross-bar.

3. A device for aiding in the correct registry of a printing plate as defined in claim 2 wherein said means for supporting said transparent sheet is adjustably affixed along said cross-bar.

4. A device for aiding in the correct registry of a printing plate having indicia thereon onto the cylinder of an offset press comprising a rectangular sheet of transparent material, said rectangular sheet being broken along a line parallel to its upper and lower edges so as to form two sections of transparent material, hinge means connecting said two sections so as to permit said two sections to lie in the same plane or in separate planes, markings on said sections whereby one may hold such printing plate substantially flush with the back of said transparent sheet and observe if such markings jibe with the indicia on said printing plate, a bar in front of said cylinder and substantially parallel to the longitudinal axis of said cylinder, and means for adjustably supporting said hinged transparent sheet on said bar.

References Cited in the file of this patent

UNITED STATES PATENTS

| | | |
|---|---|---|
| 1,820,880 | Crehore | Aug. 25, 1931 |
| 1,839,866 | Claybourne | Jan. 5, 1932 |
| 2,065,253 | Trotter | Dec. 22, 1936 |
| 2,512,937 | Hartman | June 27, 1950 |
| 2,559,533 | Daniels | July 3, 1951 |
| 2,810,204 | Imshaug | Oct. 22, 1957 |
| 2,907,274 | Taylor | Oct. 6, 1959 |

UNITED STATES PATENT OFFICE
CERTIFICATE OF CORRECTION

Patent No. 2,994,964            August 8, 1961

Samuel N. Moffett

It is hereby certified that error appears in the above numbered patent requiring correction and that the said Letters Patent should read as corrected below.

In the grant, lines 1 and 12, and in the heading to the printed specification, line 3, name of inventor, for "Samuel N. Moffet", each occurrence, read -- Samuel N. Moffett --; in the heading to the sheet of drawings, line 1, name of inventor, for "S. N. Moffet" read -- S. N. Moffett --.

Signed and sealed this 27th day of February 1962.

(SEAL)
Attest:

ERNEST W. SWIDER            DAVID L. LADD
Attesting Officer            Commissioner of Patents